Sept. 22, 1970   F. J. CALLAHAN, JR., ET AL   3,529,805

BALL VALVE

Filed Oct. 11, 1968

INVENTORS.
FRANCIS J. CALLAHAN, JR. &
STEPHEN MATOUSEK
BY
*Fay, Sharpe & Mulholland*
ATTORNEYS

# United States Patent Office 3,529,805
Patented Sept. 22, 1970

3,529,805
BALL VALVE
Francis J. Callahan, Jr., Chagrin Falls, Ohio, and Stephen Matousek, Moraga, Calif., assignors to Whitey Research Tool Co., Emeryville, Calif., a corporation of California
Filed Oct. 11, 1968, Ser. No. 766,792
Int. Cl. F16k 31/50
U.S. Cl. 251—88                                    12 Claims

ABSTRACT OF THE DISCLOSURE

This invention includes a valve body with a valve stem extending therein incorporating a rotatable ball in its tip for sealing against a valve seat within the body. The ball is held to the stem in a way which permits the ball to rotate freely within the stem end, but only about an axis substantially perpendicular to the plane of the valve seat; there being no relative rotation between the ball and seat when they are in contact. Packing around the stem is located both inside the valve body and inwardly of the threads on the stem, which packing structure will act as a fluid dam to prevent contact of the stem threads by corrosive fluids passing through the valve. A packing nut circumscribing the stem is threaded both internally to engage the position locating stem on the stem, and externally to engage an annular bonnet; both internal and external packing nut threads have the same pitch which allows the packing nut to be turned without causing any longitudinal movement of the valve stem relative to the valve seat.

BACKGROUND OF THE INVENTION

The need for a valve stem which contacts a valve seat and at the same time does not rotate relative to the valve seat has been known in the art for some time. The reason for eliminating relative rotation between these sealing surfaces is to reduce wear and scoring of the mating surfaces. A well known solution to this problem is a floating ball disposed in a socket on the end of a valve stem which contacts the valve seat. As the ball is floating free, the contact friction between fall and seat holds the ball stationary relative to the seat even though the stem is rotated. An example of this is shown in U.S. Pat. No. 1,409,-127 which shows a conventional valve body and seat with a ball disposed on the end of a stem and a cup between the ball and the end of the stem. This design has certain defects, one being that the threads on the stem are subject to contact with the fluids within the valve. The result can be corrosion and resultant binding of the threads, as well as contamination of the process fluid by the thread lubricant.

An improvement has been made on that design by relocating the packing below the threads on the stem. An example of this is shown in U.S. Pat. No. 2,841,167. The improvement also has certain defects in that, the lubricant used on the valve threads will contaminate the fluid flowing through the valve. Moreover, the structure for compressing the packing inherently requires substantial time for adjustment.

The concept of having the packing around the valve stem disposed below the stem threads is not new, nor is the combination of a sequentially radially disposed stem, packing nut and valve bonnet. Such structure is shown in Pat. No. 2,688,462. Unfortunately, that structure is inadequate in certain respects, (1) the packing nut may not be tightened without some relative movement of the stem with respect to the valve seat and (2) the materials and general valve design do not lend themselves to a ball tip stem.

On some ball valves in the prior art, the ball is spherical and over a period of time, as repeated openings and closings occur, the ball burnishes and wears away the abutting portion of the chamber in which it is enclosed. This causes scoring, scarring, scratching and other such undesirable results. Moreover, the wear generates what is known in the field as "backlash," that is, a loose ball in the socket. Over a period of time the ball becomes quite loose in its chamber and it becomes difficult for a workman operating the valve to regulate precisely the flow or to know when the valve is actually open or closed. "Backlash" is a problem in the art which has been overcome by this invention.

Another problem frequently encountered in the art occurs when the ball is made of a material which is softer than the seat. Upon closing of the valve to a tight closure, a score line is formed in the ball. Thus, as the ball is subsequently rotated by impinging fluid when the valve is open, the score line turns such that it could allow a leak past the valve seat through the small score line on the ball. These defects are, of course, undesirable and this invention proposes to overcome them.

Some of the other problems in the art which this invention intends to solve are the need to minimize the internal volume of the valve, the need to be able to compress the packing around the stem while the valve is in operation without any need to regulate the stem subsequently, and the need to prevent rotation of the ball, except about an axis perpendicular to the plane of the valve seat.

One reason the area inside the valve should be minimized is that frequently these valves are used in fluid tests and the valve and the attached lines must be completely evacuated after each test to prevent contamination of subsequently used fluids in subsequent tests. Therefore, minimizing the dead space in the valve will minimize the cost and time for evacuating the valve.

The reason it is necessary to be able to adjust the packing nut or compress the packing around the stem while the valve is in operation is that most often a leak in the valve will not be noticed while the valve is closed. When the valve is open, the equipment is operating. In many plants any material escaping from valves will be an expensive fluid such as mercury, some corrosive material such as an acid or perhaps some nuclear material. A leak will cause substantial hazards to health and personal safety and if the material is expensive, it will be very costly to have a great deal of it leak out of the valve. Obviously, it is very important that the whole operation not be shut down simply because a valve leaks. The need in the art for some mechanism for tightening the packing nut on the packing to stop a leak without having to shut off or readjust the valve after the packing is tightened is answered by this invention.

It is especially desirable to prevent rotation of the ball, except about an axis perpendicular to the plane of the valve seat; the circular line contact between the ball and the valve seat falls in a plane which is considered to be the plane of the valve seat. In this connection, when fluid flows through the inlet of a conventional ball tip valve and impinges in a tangential direction on the ball, it causes the ball to rotate and chatter in the socket. Chatter is undesirable from the standpoint of noise, wear and the compression waves caused in the fluid system. This undesirable situation is remedied by this invention.

SUMMARY OF THE INVENTION

This invention comprises a valve having a reduced dead space therein, a novel structure for compressing the stem packing and an improved tip on the valve stem. The valve includes a relatively conventional valve body with an inlet and an outlet for the fluid passing therethrough. The usual valve seat is formed in the valve body aligned with an opening which receives a valve stem.

The valve stem has a handle on its outer end for adjusting the fluid flow. At the inner end of the stem, a ball is partially enclosed in a socket and held there by the inwardly crimped edges of the wall defining the socket. The portion of the ball which remains exposed is adapted to seal against the seat to stop fluid flow through the valve. The ball has a flat area facing the inner end of the socket. This flat area serves to limit movement of the ball to rotation about an axis perpendicular to the plane of the valve seat. A disc is disposed between the flat area on the ball and the inner end of the socket which serves as a pad to reduce wear and scoring of the stem and ball.

The stem has threads intermediate the ball and the handle, as is customary. These threads allow the relative positions of the ball and seat to be adjusted to control fluid flow through the valve. In this invention the necessary packing around the stem is located intermediate the ball and the stem threads as opposed to most of the prior art where the packing is intermediate the threads and the handle. This effectively reduces the area of fluid contact inside the valve and reduces the dead space.

A chamber for holding the packing consists of essentially four walls, two concentric cylindrical surfaces defining an annulus bounded at its ends by two annular washer shaped surfaces. The inner cylindrical surface is formed by the stem; the outer cylindrical surface and the bottom washer surface are formed by a valve bonnet and the top washer surface is formed by the packing nut. If desired, a packing gland may also be disposed in the chamber adjacent the nut. The packing nut circumscribes the stem and the threads on the stem engage threads on the internal surface of the packing nut. The bonnet circumscribes the packing nut and extends below the packing nut into the valve body. The portion of the bonnet below the packing nut is the portion which forms the outer concentric cylindrical surface and the bottom annular washer shaped surface of the chamber, the bottom washer shaped surface being a radially inwardly extending flange on the lower extremity of the bonnet. Threads formed on the circumferentially outer surface of the packing nut engage threads on the inner surface of the bonnet. The pitch of all four of these threads is the same, thus the packing nut may be rotated and move up or down on the stem without changing the relative positions of the stem and the bonnet. In some cases, it is desirable to make one or more of these threads of a harder material than its mate. This results in longer thread life when exposed to high force loads (from pressure, size, etc.).

The socket on the inner end of the stem has an outer diameter larger than the stem and the merging point of the stem and socket produces a shoulder. This shoulder is of a diameter greater than the opening through the inwardly extending flange on the lower extremity of the bonnet. Consequently, when the stem is rotated to fully open the valve, the shoulder on the stem abuts the inner flange on the bonnet. The inner flange being properly shaped, the flange and shoulder cooperate to form a substantially fluidtight back seat for the valve in case of a substantial failure of the packing.

The bonnet is attached to the valve body in a conventional way. An outwardly extending flange on the bonnet is engaged by an inwardly extending flange on a union which is threaded to the valve body around the stem opening.

An object of this invention is to provide a valve having a minimum of dead space therein and minimum area within the valve exposed to the fluid passing through the valve.

Another object of this invention is to provide a valve wherein the threads on the valve stem are isolated from the fluid flowing in the valve to prevent contamination of that fluid by lubricant on the threads and to prevent corrosion of the threads by the fluid.

Another object is to prevent chatter within the valve caused by the rotation of the ball in the stem end as a result of tangential impingement on the ball by the fluid passing through the valve. The object is accomplished by making the "ball" less than spherical.

Another object of this invention is to provide a back seat for a valve which will temporarily allow the valve to function when the packing fails and still prevent substantial contact between the fluid and the threads.

DESCRIPTION OF THE PREFERRED EMBODIMENT

This invention is an improvement on valves in use today. The conventional valves of the type related to this invention all have substantially the same general elements, the distinction of this invention being the particular relationships of the elements and the unique shapes of some of those elements. All valves involved in this field include a valve body with an inlet and an outlet, a valve steam extending from the valve body, threads on the stem to allow regulation of the flow through the valve, and packing around the valve stem to prevent fluid from escaping through the stem opening. Many valves include a ball enclosed in a socket or chamber on the inner end of the stem for engaging the valve seat in the valve.

Figure 1:
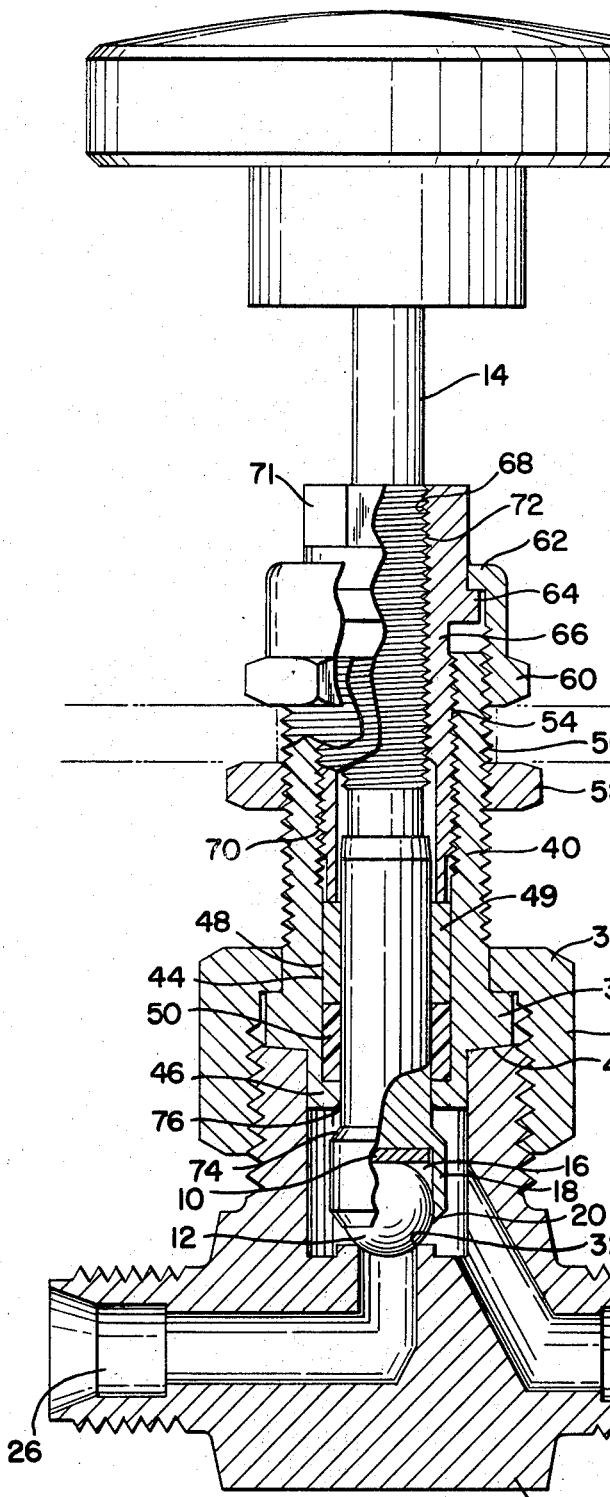
FIG. 1 shows a side elevation of the valve partially in section.

FIG. 1 shows a valve housing which includes a bonnet 40 and a body 24 having an inlet 26 and outlet 28. Stem 14 is shown disposed in the body in closed position and attached to its outer end is the customary handle 30.

Figure 2:
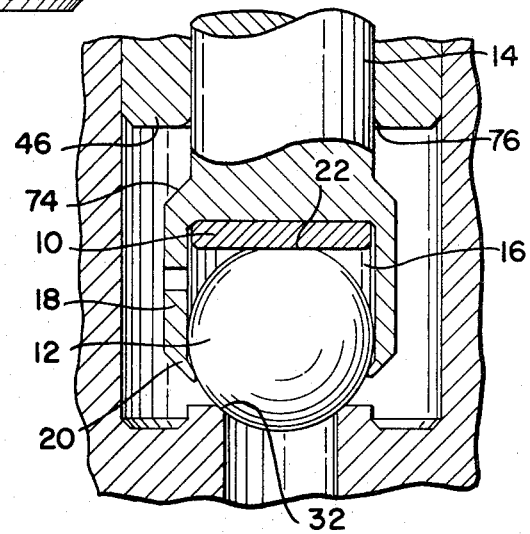
FIG. 2 shows an enlarged view of the ball end of the stem partially in section.

As best seen in FIG. 2, when the valve is closed, ball or sealing tip 12 is centered on seat 32 with the axis of seat passing substantially through the center of the ball. The ball is enclosed in a chamber or socket 16 formed on the inner end of stem 14 by annular wall 18. The annular wall extends axially toward the seat 32 for over half the diameter of the ball, and its inner edge 20 is crimped over the ball to hold it in place. Disposed in the bottom of the socket 16 is a pad 10 which engages a flat surface 22 of the ball. A clearance of approximately 0.001 inch is usually maintained, although clearances up to 0.003 inch may be acceptable.

The pad 10 is usually made of a corrosion resistant material which is harder than the stem. However in some instances the stem and pad may be of the same hardness or the pad may be eliminated altogether. This pad or bearing disc reduces wear of both the stem and the ball and substantially eliminates "backlash."

A flat surface 22 on the ball abuts pad 10 and thus, rotation of the ball is prevented except about an axis substantially perpendicular to the plane of the valve seat. As may best be seen in FIG. 2, when the valve is opened and ball 12 recedes from seat 32, fluid from the inlet 26 rushes toward the outlet 28 and tangentially impinges on the ball. This tends to rotate the ball in a counter-clockwise direction as viewed in FIG. 2. The result is a noisy chatter in the valve, disturbing pulsing pressure waves in the fluid and abrasion of the ball and the walls of chamber 16. The flat surface 22 on ball 14 prevents rotation of the ball in a vertical plane and thereby greatly reduces the chatter, wear and pressure waves.

The flat surface 22 is merely one of several equivalent structures which may be used to prevent undesired rotation of the ball 14. For example, an annular cylindrical strip around the ball with the axis of the strip substantially perpendicular to the plane of the seat would prevent ball rotation except about the allowable axis if the wall 18 closely engages the cylindrical strip; another workable alternative is an oval-shaped "ball" with pad 10 conforming to the shape of the "ball." For convenience, only the preferred embodiment is shown in the drawings although any equivalent means of preventing this undesired rotation is within the concept of this invention and the word "ball" is intended to cover all such shapes.

A union 34 is threaded to the valve body and has an internally extending shoulder 36 which engages flanges 38 of bonnet 40. Union 34 presses shoulder 36 against flange 38 and causes a seal between the valve body and the bonnet at surface 42. The bonnet 40 is disposed around stem 14 and has a counterbore 44 which serves as a chamber 48, located between the stem and the bonnet. The chamber 48 is bounded on one end by an internally extending flange 46 on the bonnet. Within the chamber, a packing gland 49 presses down on packing material 50. Obviously, the gland 49 may be eliminated if desired, whereby the lower surface of the nut 66 would contact the packing 50. In addition to serving as a fluid barrier, packing 50 gives support to stem 14 and helps to align the stem with seat 32.

Providing packing 50 low in the housing below the stem threads allows the threaded portions of the valve to be made of a different material than would be possible if the threads were exposed to the fluid passing through the valve. Certain corrosive fluids are very destructive to valve elements. Usually metals which are adequately resistant to corrosion are expensive, both in bulk and to machine. The packing structure of this invention allows the designer to prescribe material for the threads based on factors unrelated to the fluid conveyed by the vlave. The economic factors are obvious. Moreover, the lubricants ordinarily used on threads tend to contaminate process fluids if the threads are in the wetted part of the valve.

The bonnet has internal and external threads 54 and 56, respectively. The pitches of threads 56 and 54 are different, the pitch of threads 56 being greater. A mounting nut or bracket 58 is shown threaded to the exterior threads 56 of the bonnet. At the upper end of the bonnet 40, a lock nut 60 engages the threads 56 and an internally extending shoulder 62 on said lock nut engages a flange 64 on a packing nut 66. The packing nut 66 is disposed around the stem 14 and has internal and external threads 68 and 70, respectively. Both the internal and external threads on the locking nut 66 are of the same pitch. The internal threads 68 engage the threads 72 on stem 14. Threads 68, 70 and 72 have the same pitch as the threads 54 on the interior of the bonnet.

Ordinarily, during the operation of the valve, when fluid is flowing, if a leak is detected, the workman detecting the leak need only apply a wrench to the wrench flats or tool pads 71 and tighten the packing nut 66. The threads 68 and 70 being of the same pitch, tightening the nut 66 will not cause any movement of the ball 12 or stem 14 relative to the seat 32. Therefore, the flow in the valve will remain constant even though the packing nut is being tightened to stop the leak. When the packing nut has been adequately tightened the lock nut 60 may be quickly tightened down on the shoulder 64 to hold the packing nut in place.

A back seat is provided in the valve at the bevel 76 on lower shoulder 46 of the bonnet. The junction of annular wall 18 and the stem 14 provides a coacting shoulder 74 on the stem. When the valve is opened and a leak developes which cannot be corrected by tightening the packing nut, the valve may be opened as far as it will go causing the shoulder seats 74 and 76 to engage and provide a substantially fluidtight seal to prevent substantial fluid losses.

The general structure of the packing nut and other threaded attachments to the valve body provide a safety feature which is important in high pressure valves. The particular structure outlined and shown in FIG. 1 will not permit the valve stem 14 to be accidentally screwed out of the valve body. The structure as shown will allow the valve stem to be retracted only as far as shoulder 46 on the bonnet 40. Thus, inexperienced or unskilled labor will not accidentally cause the stem to be removed from the valve body while fluid is flowing.

In certain fluid systems the purity of the fluid is extremely important. Therefore, an opening in wall 18 may be provided to clean the socket 16 when necessary.

Figure 3:
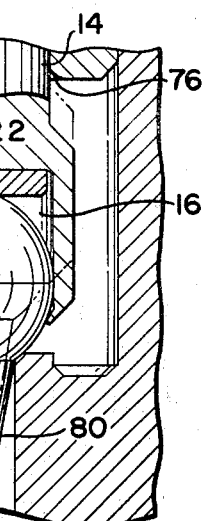
FIG. 3 shows a modification of FIG. 2 with a regulating tip integral with the ball.

FIG. 3 shows a modified ball 16 which includes a tapering nose portion 80 to provide a regulating tip. The only difference between the function of the structure of FIG. 3 and that of FIG. 2 is that the former provides a greater degree of flow control. The decision as to which ball should be incorporated in the valve is based upon the requirements of the fluid system involved.

Variations to the disclosed preferred embodiment which do not depart from the spirit of the invention will suggest themselves to those having ordinary skill in the art. The terms used to describe the invention and the illustrated embodiment are not intended to be limiting and it is intended that this invention be restricted only by the scope of the appended claims.

The invention claimed is:

1. A valve comprising
 a metallic housing having an annular seat intermediate an inlet and an outlet,
 a stem projecting through an opening in the wall of said housing for opening and closing said valve,
 the inner end of said stem terminating in an enlargement including a socket opening toward said seat,
 a hard, inflexible ball mechanically clamped within said socket to move with said stem,
 said ball including a partially spherical portion projecting from said socket for sealingly engaging said annular seat and a flat portion for engaging the interior of said socket to limit movement of said ball to rotation about an axis substantially coextensive with the axis of said annular seat,
 said flat being of a diameter less than the diameter of said ball,
 said housing including a bonnet circumscribing said stem,
 packing means for sealing between said stem and bonnet,
 a packing nut for compressing said packing.

2. The valve of claim 1 including opening means through the wall of said socket for allowing cleaning of said socket.

3. The valve of claim 1 including means for preventing the stem from being retracted from the packing nut when opening the valve.

4. The valve of claim 1 including an annular sealing surface near the inner end of said bonnet,
 an annular shoulder on the stem enlargement shaped to sealingly engage said sealing surface when the stem is in the fully open position.

5. The valve of claim 1 including internal and external threads on said packing nut for engaging threads on said stem and bonnet,
 the threads being of identical pitch.

6. The valve of claim 5 wherein the engaging threads of the stem and packing nut are of diverse hardness.

7. The valve of claim 5 including a lock nut abutting the packing nut and being threaded to the exterior of said bonnet.

8. The valve of claim 7 including wrench engaging means on said packing nut projecting outwardly of said lock nut.

9. The valve of claim 1 wherein the socket in the end of the stem includes an annular wall crimped inwardly at its inner end.

10. The valve of claim 1 wherein a substantially disc-shaped bearing plate is disposed between a flat inner wall of said socket and said flat portion of said ball.

11. The valve of claim 10 wherein the bearing plate is harder than the stem.

12. The valve of claim 1 wherein the ball includes a regulating tip projecting through the annulus formed by the valve seat.

(References on following page)

References Cited

UNITED STATES PATENTS

| | | | |
|---|---|---|---|
| 99,649 | 2/1870 | Davis | 251—368 |
| 1,409,127 | 3/1922 | Wasem | 251—86 |
| 1,693,676 | 12/1928 | Spinelle | 251—82 |
| 1,906,052 | 4/1933 | Fina. | |
| 2,300,111 | 10/1942 | Edlund | 251—88 |
| 2,688,462 | 9/1954 | Barbehenn | 251—225 |
| 3,103,340 | 9/1963 | Cope | 251—88 |

M. CARY NELSON, Primary Examiner

R. B. ROTHMAN, Assistant Examiner

U.S. Cl. X.R.

251—214, 264